Figure 1:
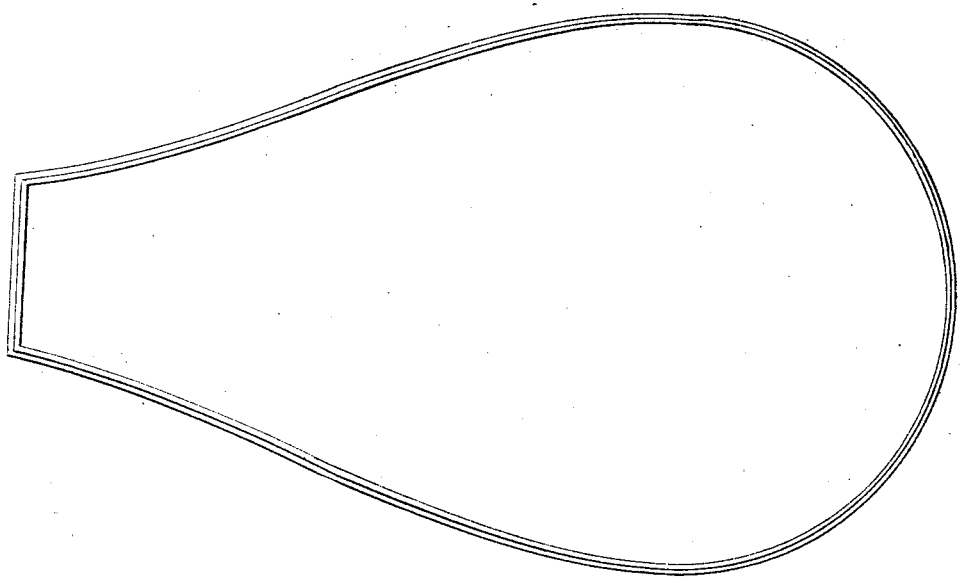
Figure 2:
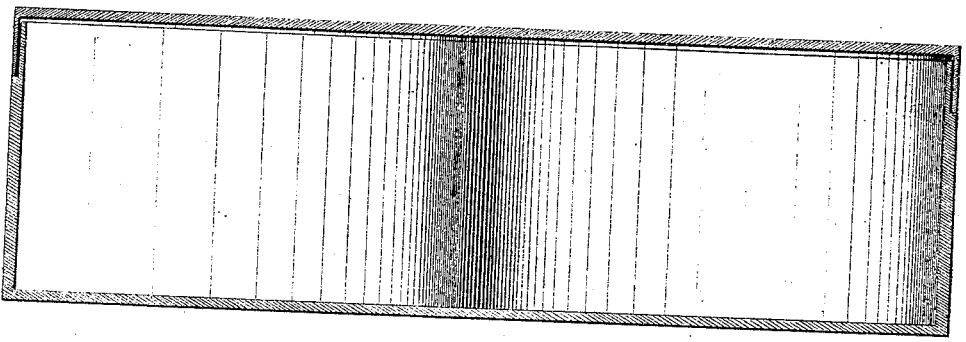

M. W. Brown,
Molded Articles.
No. 108,322. Patented Oct. 18, 1870.

Witnesses.
W. Hantt
E. F. Kastenhuber

Inventor.
Morgan W. Brown

United States Patent Office.

MORGAN W. BROWN, OF NEW YORK, N. Y.

Letters Patent No. 108,322, dated October 18, 1870.

IMPROVEMENT IN BOXES OR CASES TO CONTAIN BACON, HAMS, SIDES, &c.

The Schedule referred to in these Letters Patent and making part of the same

*To all whom it may concern:*

Be it known that I, MORGAN W. BROWN, of the city, county, and State of New York, have invented a new and improved Box or Case for Containing Hams and Shoulders; and I do hereby declare that the following is a full, clear, and exact description thereof, which will enable those skilled in the art to make and use the same.

The object of this invention is to provide a new and cheap case or box made of pasteboard, rendered impermeable to air and liquids by coatings of oil, gum arabic, or other suitable compound or mixture, for the purpose of packing and containing cured hams, shoulders, and joints of pork or beef.

Heretofore hams and shoulders have been covered and preserved in sacks of muslin or canvas dipped in a solution of lime-water. This plan is open to several objections:

First, the ham or shoulder is rendered unpleasant to the eye and cannot be handled with cleanliness.

Second, the ham or shoulder cannot readily be inspected by purchasers, as it is necessary to tear the muslin or canvas to look at the ham.

My invention overcomes these objections. By it a neat and clean covering or case for hams, shoulders, and joints of pork and beef is produced, which will enable them to be readily and easily handled without soiling the hands or clothing. By it, also, a purchaser can inspect the quality of the article within by removing the cap or cover of the box or case.

In carrying out my invention, I take straw or pasteboard and coat it with impervious solutions of gum arabic, oil, resin, or other harmless substances, on both the inside and outside, the solution or coating on the inside being to prevent the fat or grease that might come from the ham or shoulder from oozing through the paper, the solution on the outside being to render it proof against the influences of air and water.

The coating for paper, patented to me January 27, 1868, I find I can use with advantage for this purpose, but do not confine myself to that alone. The straw or pasteboard is then molded into any suitable shape, when it is ready for use. The ham or shoulder is then inserted in the box or case, and the top closed.

By the use of my invention the flavor of the ham is preserved; it is neat and clean in appearance; it is cheaper than the old method; it can be easily labeled and marked, and the quality of the ham may be examined without trouble.

I claim as new and desire to secure by Letters Patent—

As a new article of manufacture, a box or casket, made of straw or pasteboard, rendered impermeable to air and liquids by suitable coatings, for the purpose of containing cured hams, shoulders, and joints of pork and beef, substantially as herein described.

MORGAN W. BROWN.

Witnesses:
WM. F. McNAMARA,
C. WYLLYS BETTS.